US005704455A

United States Patent [19]
Watanabe

[11] Patent Number: 5,704,455
[45] Date of Patent: Jan. 6, 1998

[54] AUTOMATIC BRAKE BOOSTER

[75] Inventor: Makoto Watanabe, Saitama-Ken, Japan

[73] Assignee: Jidosha Kiki Co., Ltd., Tokyo, Japan

[21] Appl. No.: 704,452

[22] Filed: Aug. 27, 1996

[30] Foreign Application Priority Data

Sep. 29, 1995 [JP] Japan .................... 7-276949

[51] Int. Cl.⁶ .................... B60T 13/52
[52] U.S. Cl. .................... 188/356; 92/48; 91/376 R; 303/114.3; 303/113.3
[58] Field of Search .................... 188/356, 357; 303/113.3, 114.3; 92/48–50, 103 F, 103 SD, 98 R, 98 D, 6 R, 6 D, 96, 99, 100, 101, 102, 103 R, 103 M, 104; 267/122, 64.27; 91/376 R, 369.1

[56] References Cited

U.S. PATENT DOCUMENTS

| 2,773,686 | 12/1956 | Nash | 267/64.27 |
| 5,005,918 | 4/1991 | Schiel et al. | 303/114.3 |
| 5,024,304 | 6/1991 | Booten et al. | 188/356 |
| 5,080,328 | 1/1992 | Pees | 267/122 |
| 5,228,377 | 7/1993 | Watanabe . | |
| 5,235,897 | 8/1993 | Watanabe . | |

FOREIGN PATENT DOCUMENTS 5-24533  2/1993  Japan .
5-42866  2/1993  Japan .

Primary Examiner—Douglas C. Butler
Attorney, Agent, or Firm—Flynn, Thiel, Boutell & Tanis, P.C.

[57] ABSTRACT

An automatic brake booster having the functioning of an automatic brake, or more specifically, an improvement of bellows contained in a shell thereof is disclosed. The bellows comprises a stepped tubular member having portions of different diameters, namely, a reduced diameter, a medium diameter and an increased diameter. By using a reinforcing ring having a rigidity in the step, an expansion to increase the diameter of the bellows when the atmosphere is introduced into the internal space of the bellows can be prevented. Different diameters of the portions of the bellows allows the likelihood to be minimized that an output loss of the brake booster may be caused by contact of bellows portions to each other as the bellows is axially shrunk. As compared with an accordion-like bellows, the stepped tubular bellows can utilize a simplified die assembly and manufacturing steps and thus can be manufactured inexpensively.

7 Claims, 3 Drawing Sheets

AUTOMATIC BRAKE BOOSTER

FIELD OF THE INVENTION

The invention relates to an automatic brake booster which is provided with the functioning as an automatic brake, and more particularly, to an improvement of bellows contained in a shell thereof.

DESCRIPTION OF THE PRIOR ART

An automatic brake booster which is provided with a function of an automatic brake is known in the art which includes a valve body slidably disposed in a shell, a power piston mounted on the valve body, a constant and a variable pressure chamber formed across the power piston, tubular bellows disposed in the constant pressure chamber, and a valve mechanism received within the valve body for switching a fluid circuit between a control pressure passage communicating with the internal space of the bellows and a variable pressure passage communicating to the variable pressure chamber, an arrangement being such that a negative pressure or the atmosphere can be selectively supplied to the internal space of the bellows (see Japanese Laid-Open Patent Application No. 42,866/93).

In an automatic brake booster as mentioned, when the brake booster is inoperative, a negative pressure is introduced into the constant pressure chamber and the internal space of the bellows. Since the valve mechanism establishes a communication between the control pressure passage and the variable pressure passage under this condition, the negative pressure is also introduced into the variable pressure chamber. Accordingly, no pressure differential is developed across the power piston.

On the other hand, when the atmosphere is introduced into the internal space of the bellows under this condition, the atmosphere is introduced into the variable pressure chamber through the control pressure passage, the valve mechanism and the variable pressure passage, and hence a pressure differential is developed between the constant and the variable pressure chamber which are formed across the power piston without a depression of a brake pedal, whereby when the power piston is driven forward, a braking action occurs automatically.

However, when the atmosphere is introduced into the bellows, the interior of the bellows assumes a pressure higher than that of the constant pressure chamber which is outside the bellows, whereby the bellows tends to increase its diameter due to the pressure differential between the interior and the exterior thereof. An increase in the diameter of the bellows may impede a smooth expansion and/or shrinkage of the bellows which occurs as the power piston moves back and forth, and involves a likelihood that the bellows may be damaged by contact with other members. For this reason, it has been the practice of the prior art to fit a line reinforcing ring around each of the valleys (portions of a reduced diameter) of an accordion-like bellows, thus preventing the bellows from expanding.

However, an accordion-like bellows involves a high likelihood that when it is axially shrunk as the power piston is driven forward, adjacent peak portion thereof may contact each other in the axial direction to cause an output loss.

In addition, an accordion-like bellows is expensive to manufacture. Specifically, when an accordion-like bellows is manufactured, a normal practice is to use a core which is chevron-shaped in section having portions of a larger and a smaller diameter alternately in combination with an upper and a lower die disposed in surrounding relationship with the core to define an accordion-like injection space therebetween, into which rubber is injected. After the injection molding, the upper and the lower die are removed, and the bellows formed is stripped from the core. In this manner, the manufacture of a bellows requires a complicated die and employs complicated manufacturing steps.

In order to prevent a displacement of the reinforcing ring from the valleys of the bellows, it is desirable that the ring be integrally and adhesively bonded to the accordion-like bellows by vulcanization. However, although a reinforcing ring must be disposed at each valley of the core, the peak portions of the core stand in the way to disposing the reinforcing rings in position, and it is not a simple matter to adhesively bond the reinforcing rings to the bellows by vulcanization.

In view of the foregoing, the invention provides an automatic brake booster which minimizes the likelihood of causing an output loss, which can be manufactured at a reduced cost, and which permits reinforcing ring to be adhesively bonded by vulcanization in a facilitated manner.

SUMMARY OF THE INVENTION

In an automatic brake booster as mentioned above, in accordance with the invention, the bellows comprises a stepped tubular member having an increased diameter at its front end than at a rear end, and reinforcing rings are disposed in the steps of the tubular members.

With the construction of the invention, the bellows comprising the stepped tubular member has different diameters across a step or steps, and accordingly, as the power piston is driven forward to cause an axial shrinkage of the bellows, the likelihood that portions located forward and rearward of a step may contact each other is reduced in comparison to the use of an accordion-like bellows, thus minimizing the likelihood that an output loss results.

In addition, the bellows comprising a stepped tubular member can be manufactured using an inner die disposed inside thereof which is stepped and tubular and an outer die disposed outside thereof. In this manner, the construction of the die is simplified as are manufacturing steps. Hence the manufacturing cost of the bellows can be reduced. Since it is a simple matter to set a reinforcing ring in the step of either the inner or the outer die, the adhesive bonding by vulcanization of the reinforcing ring to the bellows is greatly facilitated.

Above and other objects features and advantages of the invention will become apparent from the following description of an embodiment thereof with reference to the attached drawings.

DETAILED DESCRIPTION OF THE EMBODIMENTS

Figure 1:
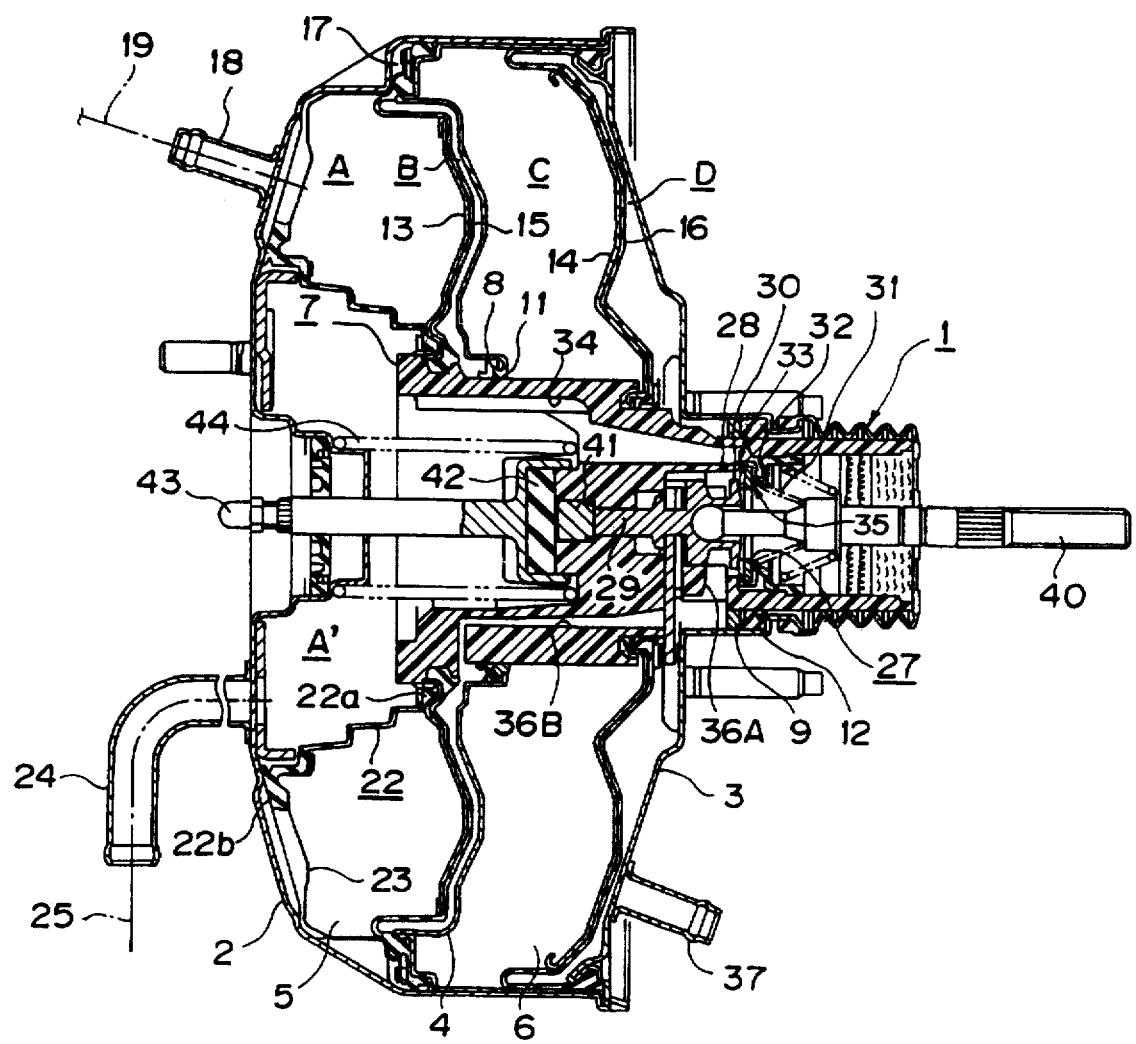
FIG. 1 is a longitudinal section of one embodiment of the invention.

Referring to the drawings, an embodiment of the invention will now be described. In FIG. 1, an automatic brake booster 1 of tandem type comprises a front shell 2 and a rear shell 3, and the space defined by the both shells is divided by a center plate 4 into a forwardly located, front chamber 5 and a rearwardly located, rear chamber 6.

A substantially tubular valve body 7 slidably extends through the axial portions of the center plate 4 and the rear shell 3 with bearings 8, 9 interposed therebetween. Annular seal members 11, 12 provide a hermetic seal between the valve body 7 on one hand and the center plate 4 and the rear shell 3 on the other hand, respectively.

A front power piston 13 and a rear power piston 14 are mounted on the outer periphery of the valve body 7, and a front diaphragm 15 and a rear diaphragm 16 are applied to the back surfaces of the these pistons, respectively. In this manner, a constant pressure chamber A and a variable pressure chamber B are defined across the front diaphragm 15, and a constant pressure chamber C and a variable pressure chamber D are defined across the rear diaphragm 16.

The constant pressure chambers A and C communicate with each other through a constant pressure passage 17 formed around the outer periphery of the front diaphragm 15, and communicate with a source of negative pressure, not shown, through a tubing 18 connected to the front shell for introducing a negative pressure, and a conduit 19 which is connected thereto. In this manner, a negative pressure is normally introduced into the constant pressure chambers A and C. A specific construction of the constant pressure passage 17 formed around the outer periphery of the front diaphragm 15 is known in the art as disclosed in Japanese Laid-Open Patent Application No. 24,533/93 and therefore will not be described.

Figure 2:
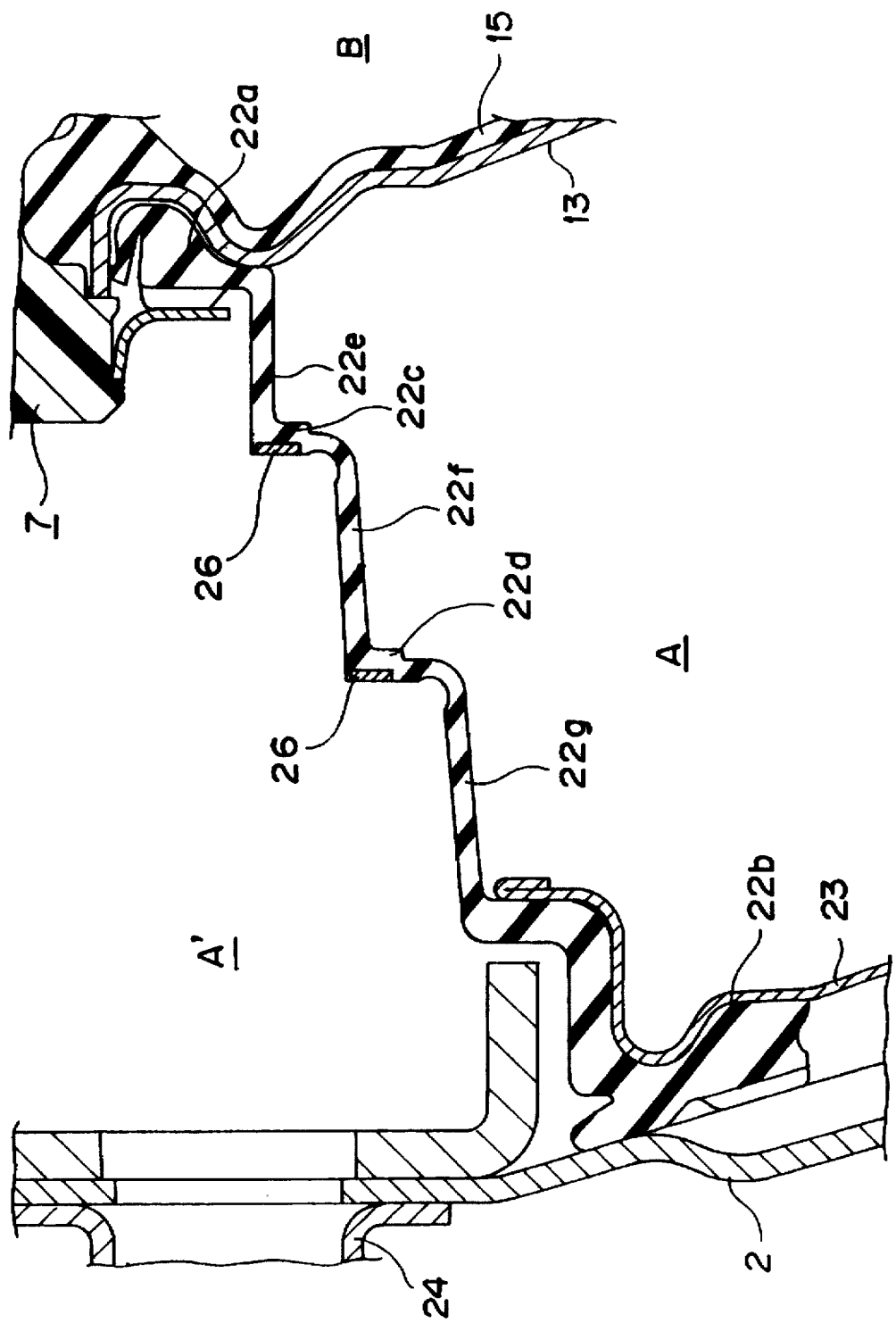
FIG. 2 is an enlarged section of bellows 22.
Figure 3:
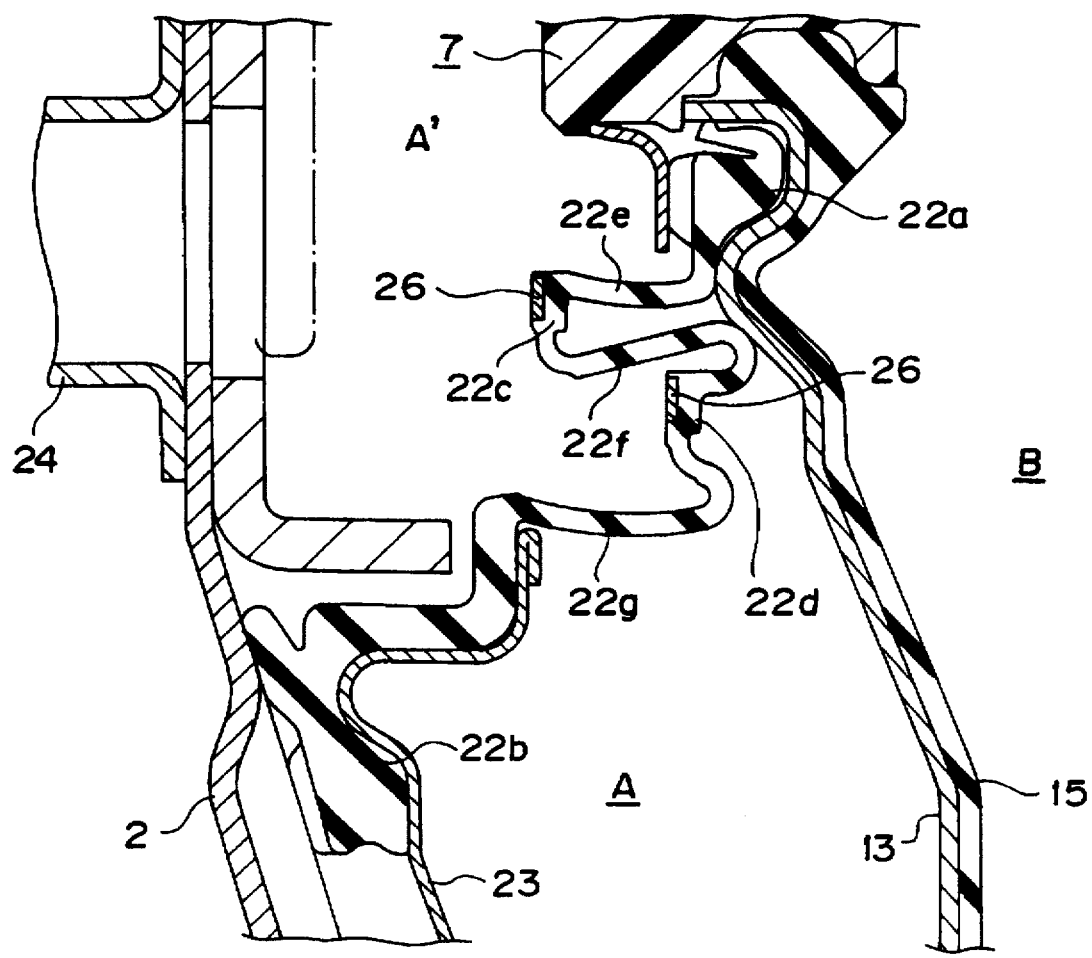
FIG. 3 is a cross section illustrating a deformation of bellows 22 when the brake booster is operated.

A bellows 22 made from rubber is disposed within the front constant pressure chamber A and has a rear end 22a which is connected to the outer periphery of the valve body 7 at its front end (see FIG. 2) and has a front end 22b which is held in abutment against the inner wall surface of the front shell 2 by a support member 23 (see FIG. 2). In this manner, the original constant pressure chamber A is divided into a space A' which is located inward of the bellows 22 and a constant pressure chamber A which is located outward of the bellows 20.

The internal space A' of the bellows 22 communicates with a conduit 25 through a tubing 24 which is connected to the front shell 2 for introduction a control pressure, and a flow path switching valve, not shown, is disposed in the conduit 25 for selectively switching the internal space A' of the bellows 22 either the atmosphere or a source of negative pressure. When the tandem brake booster 8 shown in FIG. 1 is inoperative, the flow path switching valve introduces a negative pressure into the conduit 25, whereby the negative pressure is introduced into the internal space A' of the bellows 20.

As illustrated to an enlarged scale in FIG. 2, the bellows 22 comprises a stepped tubular member having the front end 22b which is of a greater diameter than the rear end 22a. In the embodiment shown, the bellows 22 includes a pair of steps, namely, a rear step 22c and a front step 22d, whereby the bellows 22 includes a portion 22e of a reduced diameter intermediate between the rear end 22a and the rear step 22c, a portion 22f of a medium diameter intermediate the rear step 22c and the front step 22d, and a portion 22g of an increased diameter intermediate the front step 22d and the front end 22b.

The rigidity of the portion 22f of a medium diameter is chosen to be less than the rigidity of the portions 22e and 22g of a reduced diameter and an increased diameter, respectively, thus allowing the portion 22f of a medium diameter to flex easily. A reinforcing ring 26 is integrally and adhesively bonded to each of the steps 22c and 22d by vulcanization.

A valve mechanism 27 is disposed within the valve body 7, and comprises an annular, first valve seat 28 formed on the valve body 7, an annular, second valve seat 30 located radially inward of the first valve seat 28 and formed on the right end of the valve plunger 29 which is slidably disposed within the valve body 7, and a valve element 32 which is adapted to be seated upon either valve seat 28 or 30 from the right, under the resilience of a spring 31.

A combination of the first valve seat 28 and an annular seat area of the valve element 32, which is adapted to move into and out of engagement therewith defines a vacuum valve 33, and a space located radially outward of the vacuum valve 33 communicates with the internal space A' of the bellows 22 through a control pressure passage 34 formed in the valve body 7.

On the other hand, a combination of the second valve seat 30 and an annular seat area of the valve element 32, which is adapted to move into and out of engagement therewith, defines an atmosphere valve 35, and a space located radially outward of the atmosphere valve 35 and radially inward of the vacuum valve 33 communicates with the variable pressure chamber D through a radial variable pressure passage 36A formed in the valve body 7, whereby the variable pressure chambers D and B communicate with each other through an axial variable pressure passage 36B formed in the valve body 7.

The rear shell 3 has a tubing 37 connected thereto which introduces a pressure fluid and which communicates with the variable pressure chamber D. In this manner, a pressure fluid of a given pressure can be introduced into the variable pressure chamber D through the tubing 37. The purpose of providing the tubing 37 for introducing a pressure fluid, in addition to the tubing 24 which introduces a control pressure, will be described in detail later.

The right end of the valve plunger 29 is connected to an input shaft 40 which is coupled to a brake pedal, not shown, while the left end of the valve plunger 29 is disposed in opposing relationship with an output shaft 43 with a plate plunger 41 and a reaction disc 42 interposed therebetween. The left end of the output shaft 43 projects externally of the front shell 2 for connection with the piston of a master cylinder, not shown. A return spring 44 is disposed between the valve body 7 and the front shell 2 for normally maintaining the valve body 7 in its inoperative position shown.

When the tandem brake booster 1 is inoperative, the vacuum valve 33 of the valve mechanism 27 is open while the atmosphere valve 35 is closed, whereby a negative pressure is introduced into the respective chambers A, B, C and D. The negative pressure is also introduced into the internal space A' of the bellows 22.

When a brake pedal, not shown, is depressed under this inoperative condition, the input shaft 40 which is coupled to the valve mechanism 27 is driven to the left, whereby the valve element 32 will be seated upon the first valve seat 28 to close the vacuum valve 33, followed by a movement of the second valve seat 30 away from the valve element 32 to open the atmosphere valve 35, thus introducing the atmosphere into the both variable pressure chamber B, D. As a consequence, a pressure differential is developed between the both variable pressure chambers B, D and both constant pressure chambers A, C, and drives the valve body 7 forward, thus allowing an output at a given servo ratio to be obtained from the output shaft 43 in the similar manner as in a conventional tandem brake booster.

In contrast to a braking action in the normal manner as mentioned above, when it is desired to cause the tandem brake booster 1 to function as an automatic brake, the flow path switching valve mentioned above is operated under the inoperative condition shown in FIG. 1, introducing the atmosphere, rather than a negative pressure, into the internal space A' of the bellows 22. The atmosphere introduced into the internal space A' of the bellows 22 is also introduced into the both variable pressure chamber B and D through the control pressure passage 34, the vacuum valve 33 which is then opened and both variable pressure passages 36A, 36B, developing a pressure differential between the both constant pressure chambers A, C and both variable pressure chambers B, D to actuate the brake booster despite the brake pedal not being depressed.

It is to be noted when the brake pedal is lightly depressed to operate the tandem brake booster 1, the vacuum valve 33 is closed so that if the flow path switching valve is operated under this condition to introduce the atmosphere into the internal space A' of the bellows 22, the atmosphere cannot be introduced into the variable pressure chambers B, D. In such instance, by detecting such condition by means of a sensor, not shown, to supply the atmosphere from the tubing 37 into the variable pressure chamber D, the output from the booster can be increased without increasing the force with which the brake pedal is depressed.

When the atmosphere is introduced into the internal space A' of the bellows 22, a pressure differential between the internal space A' and the constant pressure chamber A which is located outside the internal space causes the bellows 22 to tend to expand outwardly. However, this action is countered by the reinforcing rings 26 which are fitted in the steps 22c, 22d of the bellows 22.

As the front power piston 23 moves forward to cause an axial shrinkage of the bellows 22, the portion 22e of a reduced diameter and the portion 22g of an increased diameter, both having a relatively high rigidity, tend to maintain their condition while the portion 22f of a medium diameter which has a relatively less rigidity becomes reversed between the rear step 22c and the front step 22d. In this manner, the portions 22e, 22f and 22g of different diameters reduce the likelihood that they contact each other in the axial direction to impede the forward movement of the power piston 18 as the bellows 22 is axially shrunk, and accordingly, the likelihood that an output loss from the brake booster can be reduced.

The bellows 22 which comprises a stepped tubular member can be manufactured by an inner die, not shown, which is stepped and tubular and which is disposed inside the bellows 22 and an outer die which is disposed in surrounding relationship with the bellows 22, and hence the die construction is simplified as are the manufacturing steps. When such inner and outer dies are used, these dies can be used to manufacture the bellows 22 while the reinforcing rings 26 are set in the steps thereof, whereby the reinforcing rings 26 can be adhesively bonded to the bellows 22 by vulcanization in a greatly facilitated manner. When the reinforcing rings 26 are integrally and adhesively bonded to the bellows by vulcanization, a displacement of the reinforcing rings 26 from the bellows 22 can be prevented.

In the above description, the bellows 22 is provided with a pair of steps 22c, 22d, but it should be understood that any number of steps equal to or greater than 1 may be used.

While the invention has been disclosed above in connection with an embodiment thereof, it should be understood that a number of changes, modifications and substitutions therein are possible without departing from the spirit and scoop of the invention defined by the appended claims.

What is claimed is:

1. An automatic brake booster including a valve body slidably disposed in a shell, a power piston mounted on the valve body, a constant and a variable pressure chamber defined across the power piston, a tubular bellows disposed within the constant pressure chamber, and a valve mechanism received within the valve body for switching a fluid circuit between a constant pressure passage communicating with the internal space of the bellows and a variable pressure passage communicating to the variable pressure chamber, thus allowing either a negative pressure or the atmosphere to be selectively supplied to the internal space of the bellows, wherein the bellows comprises a stepped tubular member having a small diameter portion, a middle diameter portion and a large diameter portion, these portions being formed in the mentioned order, and a reinforcing ring being disposed in at least one radial step of the stepped tubular member.

2. An automatic brake booster according to claim 1 in which the stepped tubular member is provided with a rear step and a front step, the small diameter portion being intermediate a rear end of the stepped tubular member and the rear step, the middle diameter portion being intermediate the rear step and the front step, the large diameter portion being intermediate between the front step and a front end of the stepped tubular member, and the front end of the stepped tubular member having a greater diameter than the rear end of the stepped tubular member.

3. An automatic brake booster according to claim 2 in which the middle diameter portion has a rigidity which is less than the rigidity of the small diameter and large diameter portions.

4. An automatic brake booster according to claim 1 in which a said reinforcing ring is disposed in each said radial step and said rings are adhesively bonded to the respective step of the stepped tubular member by vulcanization.

5. An automatic brake booster according to claim 1, wherein the reinforcing ring is rigid sufficient to prevent expansion of the diameter of the bellows.

6. An automatic brake booster according to claim 2, wherein a support member secures the front end of the stepped tubular member to an inner wall surface of the shell.

7. An automatic brake booster according to claim 2, wherein one said reinforcing ring is disposed in each of said rear step and said front step.

* * * * *